United States Patent
Hogan et al.

(10) Patent No.: US 10,287,104 B1
(45) Date of Patent: May 14, 2019

(54) SYSTEM AND METHOD TO CONTROL A CONVEYOR SYSTEM

(71) Applicant: Caterpillar Paving Products Inc., Brooklyn Park, MN (US)

(72) Inventors: Lee M. Hogan, Varna, IL (US); Timothy Michael O'Donnell, Long Lake, MN (US); Daniel Podany, Clarkson, NE (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/804,539

(22) Filed: Nov. 6, 2017

(51) Int. Cl.
| | |
|---|---|
| *B65G 43/00* | (2006.01) |
| *B65G 43/10* | (2006.01) |
| *B65G 41/00* | (2006.01) |
| *B65G 23/00* | (2006.01) |
| *E01C 23/12* | (2006.01) |
| *E01C 23/088* | (2006.01) |

(52) U.S. Cl.
CPC ............ *B65G 43/00* (2013.01); *B65G 23/00* (2013.01); *E01C 23/088* (2013.01); *E01C 23/127* (2013.01); *E01C 2301/00* (2013.01)

(58) Field of Classification Search
None
See application file for complete search history.

(56) References Cited

U.S. PATENT DOCUMENTS

| | | | |
|---|---|---|---|
| 4,232,255 A | 11/1980 | Carlen | |
| 4,928,890 A | 5/1990 | Swisher, Jr. | |
| 4,929,121 A * | 5/1990 | Lent ..................... | E01C 23/088 299/1.5 |
| 5,495,420 A * | 2/1996 | Demarest ........... | A61B 17/0467 29/703 |
| 7,077,345 B2 | 7/2006 | Byram et al. | |
| 9,267,446 B2 | 2/2016 | Killion et al. | |
| 9,463,933 B2 | 10/2016 | Diebold et al. | |
| 9,464,391 B2 | 10/2016 | Killion et al. | |

FOREIGN PATENT DOCUMENTS

| | | |
|---|---|---|
| CN | 104594163 | 9/2016 |
| GB | 1055361 | 1/1967 |
| WO | WO2015034501 | 3/2015 |

* cited by examiner

*Primary Examiner* — Kavel Singh

(57) ABSTRACT

A control system for a conveyor system of a machine includes a motor to drive the conveyor system, and a pump operably coupled to the motor. A solenoid actuator actuates the pump. The control system includes operator interfaces to enable an operator to provide inputs indicative of a desired engine speed, and a desired conveyor speed. The control system includes a controller which determines a pump speed based on the desired engine speed, and determines a maximum possible motor speed based on the pump speed and a maximum possible gear ratio between the pump and the motor. The controller determines a desired motor speed based on the desired conveyor speed. The controller determines a solenoid actuation current based on the desired motor speed and the maximum possible motor speed, and supplies the solenoid actuation current to the solenoid actuator to control a speed of the conveyor system.

20 Claims, 4 Drawing Sheets

SYSTEM AND METHOD TO CONTROL A CONVEYOR SYSTEM

TECHNICAL FIELD

The present disclosure relates to a cold planer. More specifically, the present disclosure relates to control of a conveyor system of the cold planer.

BACKGROUND

Cold planers, also referred to as road mills or scarifiers, are milling machines that typically include a frame propelled by tracked drive units. The frame supports an engine, an operator station, and a milling drum among other components. The milling drum, fitted with cutting tools, is rotated through a suitable interface by the engine to break up the surface of the roadway. The roadway material is deposited by the milling drum onto a lower or first conveyor for removal from the underside of the machine. The first conveyor may have a lower end to receive the material and transfer to an upper end. The material is then transferred from the upper end of the first conveyor onto a second conveyor. The second conveyor transports the material away from the machine and over a nearby haul truck. The material travels up the second conveyor and falls off the end into the haul truck for transportation away from the jobsite.

Typically, the second conveyor is configured to transport the material at a rate and/or trajectory dependent upon vehicle dynamics such as engine speed, from the machine into a haulage machine such as the haul truck. However, substantial change in the rate and/or trajectory may not be generally desirable in view of inability to control the material being delivered to the haul truck. Furthermore, the material may fall outside the haul track thereby creating need of labor and time resources that are desired to be avoided.

For example, U.S. Pat. No. 7,077,345 (hereinafter referred to as '345 reference) discloses a horizontal grinder. The '345 reference discloses a grinder having a grinding structure and upper and lower feed conveyors for feeding material toward the grinding structure, wherein the upper feed conveyor is positioned above the lower feed conveyor. Further, the grinder also includes a power source for powering the grinding structure. A controller configured for controlling the speed of at least one of the lower and upper feed conveyors in proportion to an operating characteristic of the power source.

SUMMARY

In an aspect of the present disclosure, a control system for a conveyor system of a machine is provided. The control system includes a motor to drive the conveyor system. The control system includes a pump operably coupled to the motor. The control system includes a solenoid actuator to actuate the pump. The control system includes a first operator interface which enables an operator to provide input indicative of a desired engine speed of the machine, and generates a first signal indicative of the desired engine speed. The control system includes a second operator interface which enables the operator to provide input indicative of a desired conveyor speed, and generates a second signal indicative of the desired conveyor speed. The control system includes a controller communicably coupled to the motor, the pump, the solenoid actuator, the first operator interface, and the second operator interface. The controller receives the first signal indicative of the desired engine speed. The controller determines a pump speed of the pump based on the desired engine speed. The controller determines a maximum possible motor speed of the motor based on the pump speed of the pump and a maximum possible gear ratio between the pump and the motor. The controller receives the second signal indicative of the desired conveyor speed. The controller determines a desired motor speed of the motor based on the desired conveyor speed. The controller determines a solenoid actuation current based on the desired motor speed of the motor and the maximum possible motor speed of the motor. The controller then supplies the solenoid actuation current to the solenoid actuator to actuate the pump to drive the motor at the desired motor speed. The controller controls a speed of the conveyor system based on the supplied solenoid actuation current.

In another aspect of the present disclosure, a method to control a conveyor system of a machine is provided. The method includes receiving a first signal indicative of a desired engine speed using a controller. The method includes determining a pump speed of a pump based on the desired engine speed of the machine using the controller. The method includes determining a maximum possible motor speed of a motor based on the pump speed of the pump and a maximum possible gear ratio between the pump and the motor using the controller. The method includes receiving a second signal indicative of the desired conveyor speed using the controller. The method includes determining a desired motor speed of the motor based on the desired conveyor speed using the controller. The method includes determining a solenoid actuation current based on the desired motor speed of the motor and the maximum possible motor speed of the motor using the controller. The method includes supplying the solenoid actuation current to actuate the pump to drive the motor at the desired motor speed of the motor. The method further includes controlling a speed of the conveyor system based on the supplied solenoid actuation current using the controller.

In yet another aspect of the present disclosure, a machine is provided. The machine includes a frame and a conveyor system coupled to the frame. The conveyor system includes a primary conveyor coupled to the frame. The conveyor system includes a secondary conveyor which conveys a milled material from the primary conveyor to a discharge location. The conveyor system includes a motor to drive the secondary conveyor. The conveyor system includes a pump operably coupled to the motor. The conveyor system includes a solenoid actuator to actuate the pump. The machine includes a controller communicably coupled to the motor, the pump, and the solenoid actuator. The controller receives the first signal indicative of the desired engine speed of the machine. The controller determines a pump speed of the pump based on the desired engine speed of the machine. The controller determines a maximum possible motor speed of the motor based on the pump speed of the pump and a maximum possible gear ratio between the pump and the motor. The controller receives the second signal indicative of the desired secondary conveyor speed of the secondary conveyor. The controller determines a desired motor speed of the motor based on the desired secondary conveyor speed of the secondary conveyor. The controller determines a solenoid actuation current of the solenoid actuator based on the desired motor speed of the motor and the maximum possible motor speed of the motor. The controller supplies the solenoid actuation current to the solenoid actuator to actuate the pump to drive the motor at the desired motor speed of the motor. The controller controls a speed of the conveyor system based on the supplied solenoid actuation current.

DETAILED DESCRIPTION

Figure 1:
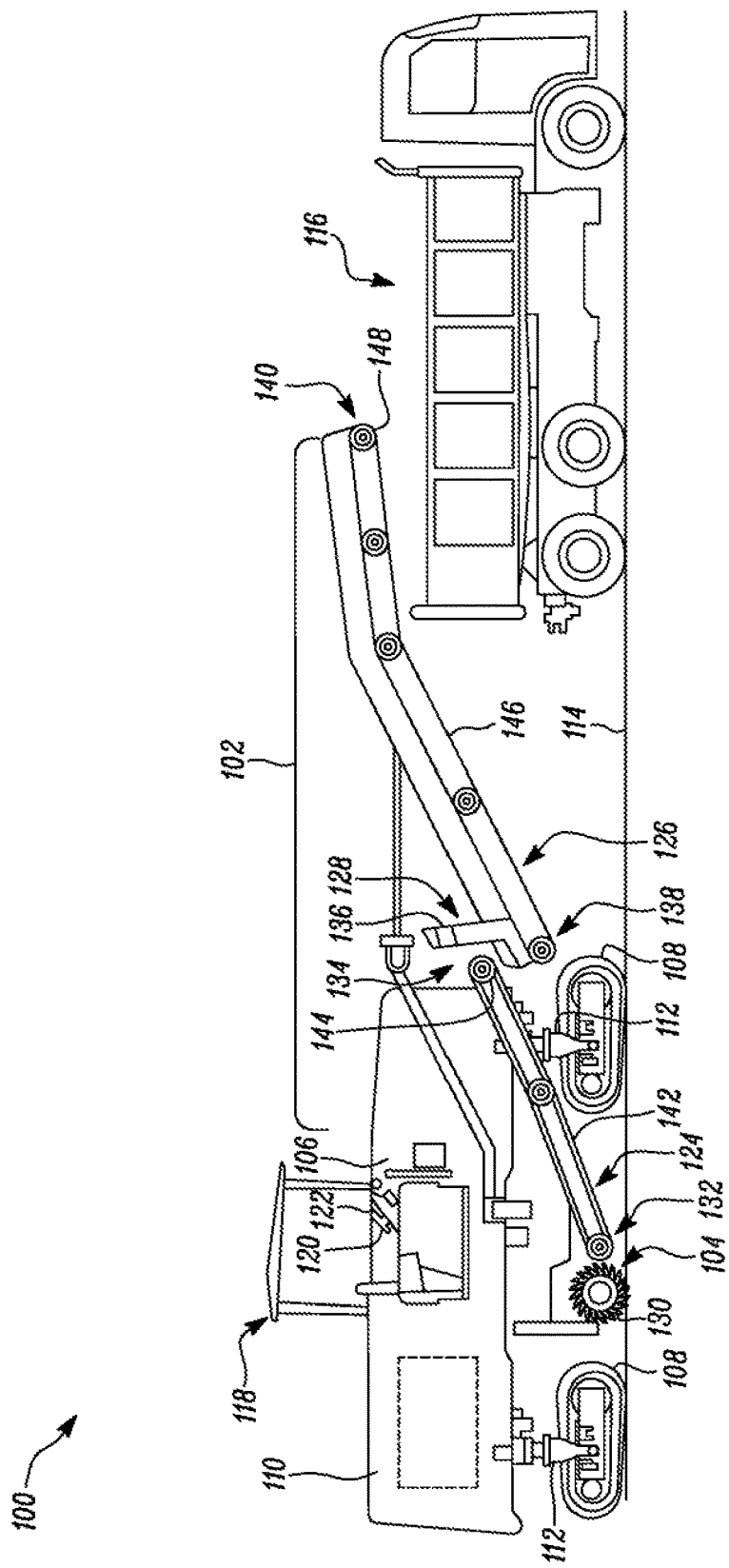
FIG. 1 illustrates an exemplary machine having a conveyor system, in accordance with some embodiments of the present disclosure.

FIG. 1 illustrates an exemplary machine 100. The machine 100 is illustrated as a cold planer. The machine 100 includes a conveyor system 102 associated with a milling drum 104. The machine 100 includes a frame 106 supported by one or more traction devices 108. The machine 100 includes an engine 110 which may supply required power to drive the conveyor system 102, the milling drum 104, and the traction devices 108. The traction devices 108 may include either wheels or tracks connected to lifting columns 112 which are adapted to controllably raise and lower the frame 106 and the milling drum 104 relative to a ground surface 114. In the illustrated embodiment, the traction devices 108 are shown as tracks. The conveyor system 102 may be connected at a leading end to the frame 106 and configured to transport material away from the milling drum 104 and into a waiting haul vehicle 116. The haul vehicle 116 is illustrated as a haul truck. However, it should be contemplated that the haul vehicle 116 may be any other such vehicle as well which may be used to haul the material cut by the milling drum 104.

The frame 106 further supports an operator station 118 having one or more operator interfaces which may be used to provide inputs to control the machine 100. The operator interface may be a user interface (e.g., a graphical user interface), a display screen, a touch screen, a keypad, a joystick, a button, a microphone, and/or a smart device which may be coupled to the machine 100 to provide the operator input. The operator station 118 includes a first operator interface 120 and a second operator interface 122. The first operator interface 120 enables an operator to provide an input indicative of a desired engine speed 302 (illustrated in FIG. 3) of the machine 100, and subsequently generates (based on the input) a first signal indicative of the desired engine speed 302 of the machine 100. The second operator interface 122 enables the operator to provide an input indicative of a desired secondary conveyor speed 308 (interchangeably referred to as a desired conveyor speed 308, illustrated in FIG. 3) of the secondary conveyor 126, and generates (based on the input) a second signal indicative of the desired secondary conveyor speed 308. Further details about the first operator interface 120 and the second operator interface 122 will be described below.

The conveyor system 102 may include various components that are used to remove broken up asphalt away from the milling drum 104. Specifically, the conveyor system 102 includes a primary conveyor 124, a secondary conveyor 126, and a transition area 128 located between the primary conveyor 124 and the secondary conveyor 126. Cutting tools 130 of the milling drum 104 may be configured to deliver milled asphalt onto a charge end 132 of the primary conveyor 124 as the milling drum 104 rotates towards the primary conveyor 124. As the milled asphalt exits a discharge end 134 of the primary conveyor 124, the milled asphalt may strike against a weldment 136 located within the transition area 128. The transition area 128 may be an enclosed box-like structure and, upon coming into forced contact with the weldment 136, the milled asphalt may break apart and fall onto a charge end 138 of the secondary conveyor 126. The secondary conveyor 126 may discharge the milled asphalt into the haul vehicle 116 from a discharge end 140. The secondary conveyor 126 may be capable of moving side-to-side and up-and-down to facilitate the discharge of milled asphalt into the haul vehicle 116.

The primary conveyor 124 includes a belt 142 that is driven to rotate about spaced apart rollers or pulleys 144 by an associated motor (not shown). Similarly, the secondary conveyor 126 includes a belt 146 that is driven to rotate about spaced apart rollers or pulleys 148 by an associated motor 202 (shown in FIG. 2). A rotational speed of the motor 202 may be adjustable so as to regulate a speed of the material carried by the belt 146. In some embodiments, the speed of the primary conveyor 124 may be fixed. Additionally or alternatively, the speed of the primary conveyor 124 may be automatically adjustable (via rotational speed adjustment of the motor 202) based on one or more operational characteristics of the machine 100 (e.g., engine speed, speed of the machine 100, steering, milling drum depth, milling drum speed, milling drum torque, etc.), while the speed of the secondary conveyor 126 may be independently and directly adjustable (via rotational speed adjustment of the motor 202) based on an operator input. Adjustment of the speed of the secondary conveyor 126 is described in detail below.

Figure 2:
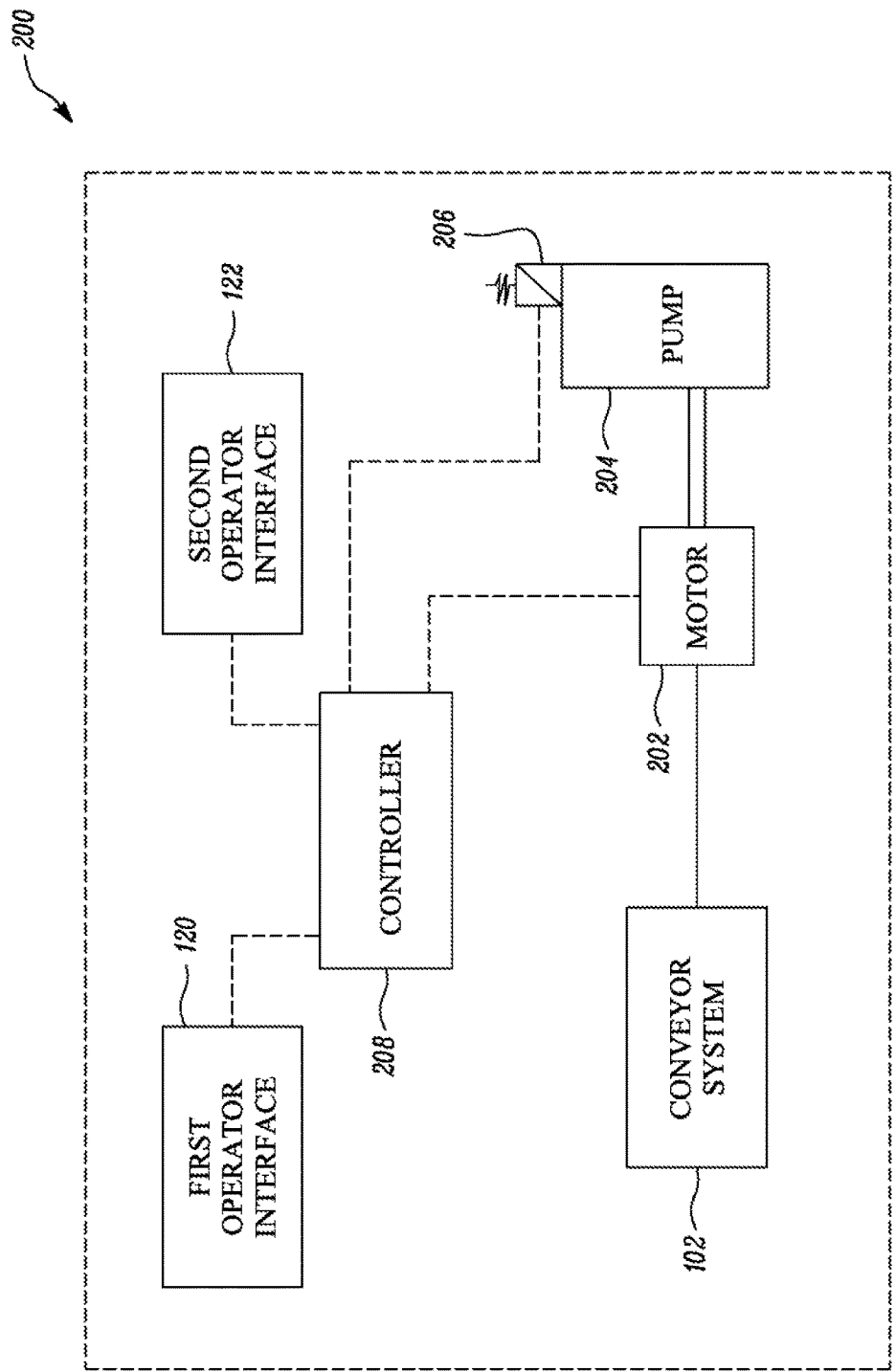
FIG. 2 schematically illustrates a control system for the conveyor system, in accordance with some embodiments of the present disclosure.

FIG. 2 illustrates a control system 200 for controlling the conveyor system 102. More specifically, the control system 200 controls the secondary conveyor 126 of the conveyor system 102. The control system 200 includes the motor 202 which drives the secondary conveyor 126 of the conveyor system 102. The control system 200 includes a pump 204 operatively coupled to the motor 202. The pump 204 may be a variable displacement pump which may be actuated by a solenoid actuator 206.

The solenoid actuator 206 operates in a range of electrical current values defined as a solenoid modulation range of the solenoid actuator 206. The solenoid modulation range of the solenoid actuator 206 may be a range of electrical current values between a minimum calibration current of the solenoid actuator 206 and a maximum calibration current of the solenoid actuator 206. The minimum calibration current may be defined as a minimum value of electric current which may be supplied to the solenoid actuator 206 to actuate the pump 204. Similarly, the maximum calibration current of the solenoid actuator 206 may be defined as a maximum value of electric current which may be supplied to the solenoid actuator 206 to actuate the pump 204. In this regard, the solenoid modulation range of the solenoid actuator 206 corresponds to a range between the maximum calibration current of the solenoid actuator 206 and the minimum calibration current of the solenoid actuator 206.

The control system 200 includes the first operator interface 120. The first operator interface 120 enables the operator to provide input indicative of a desired speed of the engine 110 of the machine 100 (e.g., the desired engine speed 302 of the machine 100), and generate the first signal indicative of the desired engine speed 302. The first operator interface 120 may be any type of an operator interface which may allow the operator to provide a desired input indicative of the desired engine speed 302 of the machine 100. It should be contemplated that the present disclosure is not limited by the type of the first operator interface 120 in any manner.

The control system 200 includes the second operator interface 122. The second operator interface 122 enables the operator to provide input indicative of the desired conveyor speed 308. More specifically, the second operator interface 122 enables the operator to provide input indicative of a desired speed of the secondary conveyor 126 (e.g., the desired secondary conveyor speed 308). In the context of the present disclosure, the desired secondary conveyor speed 308 is interchangeably referred to as the desired conveyor speed 308. The second operator interface 122 may be any type of an operator interface which may allow the operator to provide desired input indicative of the desired secondary conveyor speed 308. It should be contemplated that the present disclosure is not limited by the type of the second operator interface 122 in any manner. In some embodiments, the second operator interface 122 is a keypad having one or more buttons.

The control system 200 further includes a controller 208. The controller 208 may be a single controller or multiple controllers working together to perform a variety of tasks. The controller 208 may include a single or multiple microprocessors, field programmable gate arrays (FPGAs), digital signal processors (DSPs), etc. Various circuits may be associated with the controller 208, including power supply circuitry, signal-conditioning circuitry, actuator driver circuitry (i.e., circuitry powering solenoids, motors, or piezo actuators), and communication circuitry. Additionally, and/or alternatively, various systems may be included in the controller 208, including dual fuel management system, power management system, and alarm & monitoring system etc.

The controller 208 is communicably coupled to the motor 202, the pump 204, the solenoid actuator 206, the first operator interface 120, and the second operator interface 122. The controller 208 receives the first signal indicative of the desired engine speed 302 of the machine 100 from the first operator interface 120. The controller 208 receives the second signal indicative of the desired conveyor speed 308 from the second operator interface 122.

Figure 3:
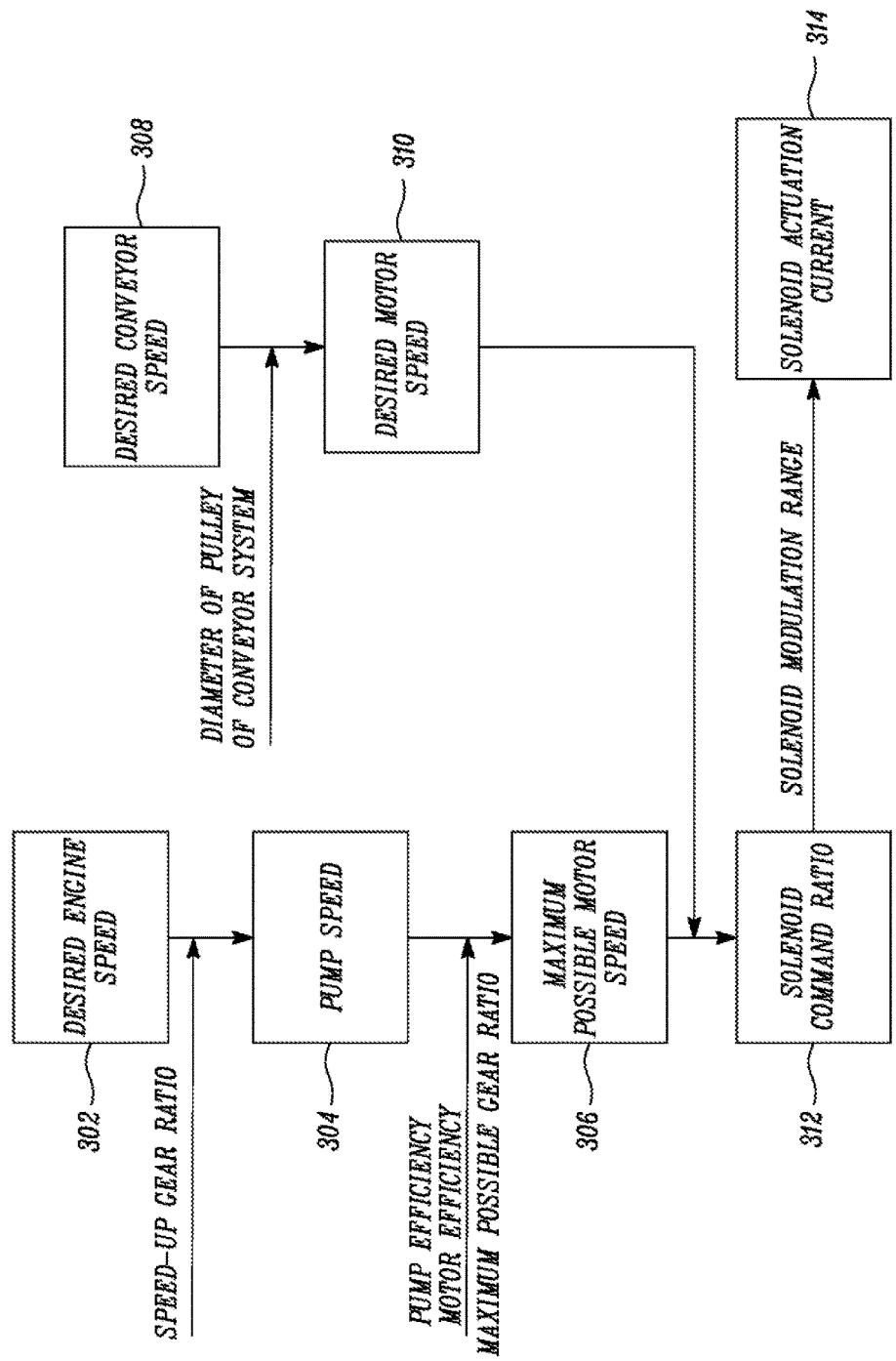
FIG. 3 illustrates working of the control system, in accordance with some embodiments of the present disclosure.
Figure 4:
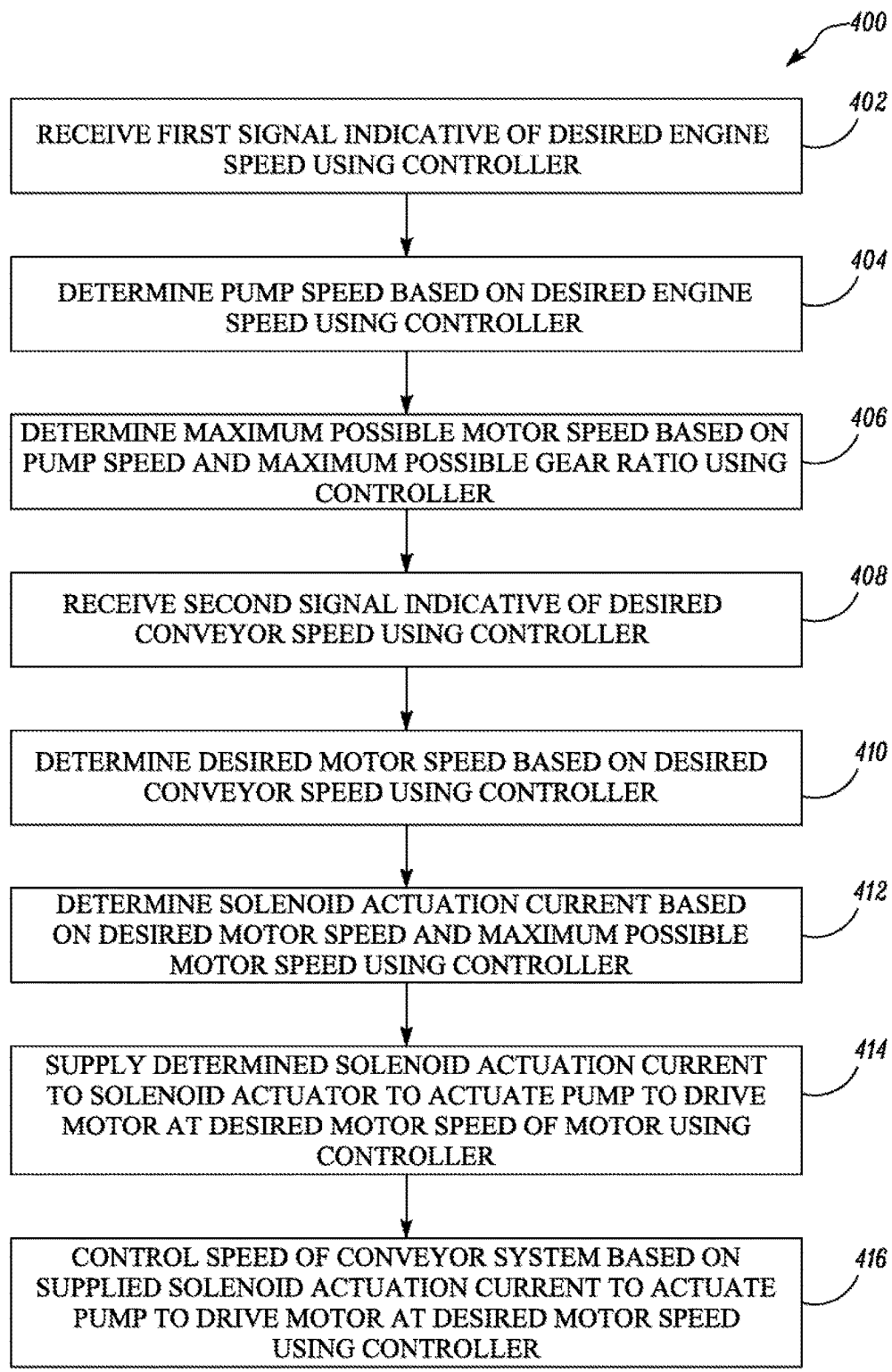
FIG. 4 illustrates a flowchart for a method to control the conveyor system of the machine, in accordance with some embodiments of the present disclosure.

FIG. 3 shows further details of the various parameters determined by the controller 208 to control the conveyor system 102. The controller 208 receives the desired engine speed 302 of the machine 100 from the first operator interface 120. The controller 208 determines a pump speed 304 of the pump 204 based on the desired engine speed 302 of the machine 100. More specifically, the controller 208 determines the pump speed 304 of the pump 204 based on the desired engine speed 302 of the machine 100 and a speed-up gear ratio. The speed-up gear ratio may be indicative of a gear ratio between the secondary conveyor 126 and the primary conveyor 124 when the speed of the secondary conveyor 126 is increased. In the context of the present disclosure, the gear ratio may be defined as number of passes completed by the belt 146 of the secondary conveyor 126 over the pulleys/rollers 148 in a time period during which the belt 142 of the primary conveyor 142 completes one pass over the pulleys/rollers 144. In some embodiments, the controller 208 may determine the pump speed 304 of the pump 204 by multiplying the desired engine speed 302 of the machine 100 and the speed-up gear ratio between the secondary conveyor 126 and the primary conveyor 124.

The controller 208 determines a maximum possible motor speed 306 of the motor 202 based on the pump speed 304 of the pump 204, and a maximum possible gear ratio between the pump 204 and the motor 202. The maximum possible gear ratio may be defined based on a pump size of the pump 204 and a motor size of the motor 202. In the context of the present disclosure, the maximum possible gear ratio between the pump 204 and the motor 202 refers to a maximum possible ratio of output power of the pump 204 which may be supplied to the motor 202 by the pump 204. In some embodiments, the maximum possible gear ratio may be a ratio of the pump size of the pump 204 and the motor size of the motor 202. The controller 208 determines the maximum possible motor speed 306 of the motor 202 based on the pump speed of the pump 204, the maximum possible gear ratio between the pump 204 and the motor 202, a pump efficiency of the pump 204, and/or a motor efficiency of the motor 202. In some embodiments, the controller 208 may cause values of the pump efficiency of the pump 204 and the motor efficiency of the motor 202 to be stored in an associated memory of the controller 208. In some embodiments, the controller 208 determines the maximum possible motor speed 306 of the motor 202 by multiplying the pump speed 304 of the pump 204, the maximum possible gear ratio between the pump 204 and the motor 202, the pump efficiency of the pump 204, and/or the motor efficiency of the motor 202.

The controller 208 determines a desired motor speed 310 of the motor 202 based on the desired conveyor speed 308. The controller 208 may determine the desired motor speed 310 of the motor 202 based on the desired conveyor speed 308 and the secondary conveyor 126 (e.g., a diameter of the roller 148 of the secondary conveyor 126). More specifically, the controller 208 determines the desired motor speed 310 of the motor 202 by obtaining a ratio of the desired conveyor speed 308 and the diameter of the roller 148. For example, if the desired conveyor speed 308 is provided in meters per minute, and the diameter of the roller 148 is provided in millimeters, conversion of the measurement units will be done accordingly, and the desired motor speed 310 will be calculated in rotations per minute (rpm).

The controller 208 further determines a solenoid command ratio 312 of the solenoid actuator 206. The solenoid command ratio 312 of the solenoid actuator 206 is indicative of a ratio of desired current to be supplied to the solenoid actuator 206 to the maximum current which can be supplied to the solenoid actuator 206. The solenoid command ratio 312 of the solenoid actuator 206 may be calculated based on the desired motor speed 310 of the motor 202 and the maximum possible motor speed 306 of the motor 202. In some embodiments, the controller 208 may determine the solenoid command ratio 312 by obtaining a ratio of the desired motor speed 310 of the motor 202 and the maximum possible motor speed 306 of the motor 202. The controller 208 may then determine the solenoid modulation range of the solenoid actuator 206 by determining the range between the minimum calibrated current of the solenoid actuator 206 and the maximum calibrated current of the solenoid actuator 206. In some embodiments, the controller 208 may cause values of the solenoid modulation range to be stored in the associated memory of the controller 208. In some embodiments, the controller 208 may determine a solenoid actuation current 314 of the solenoid actuator 206 based on the minimum calibrated current of the solenoid actuator 206, the solenoid command ratio 312 of the solenoid actuator 206, and/or the solenoid modulation range of the solenoid actuator 206. The controller 208 may multiply the solenoid modulation range of the solenoid actuator 206 with the solenoid command ratio 312 of the solenoid actuator 206 to determine a multiplication value, and then add the determined multiplication value to minimum calibrated current of the solenoid actuator 206 to determine the solenoid actuation current 314 of the solenoid actuator 206.

After determining the solenoid actuation current 314 of the solenoid actuator 206, the controller 208 may supply the solenoid actuation current 314 to the solenoid actuator 206, and actuate the pump 204 to drive the motor 202. The controller 208 controls a speed of the conveyor system 102 based on the supplied solenoid actuation current 314 of the solenoid actuator 206 to actuate the pump 204 to drive the motor 202. Actuating the pump 204 to drive the motor 202 at the desired motor speed 310 of the motor 202 ensures the speed of the secondary conveyor 126 to be the desired conveyor speed 308.

INDUSTRIAL APPLICABILITY

The present disclosure provides a method 400 of controlling the conveyor system 102. At step 402, the controller 208 receives the first signal indicative of the desired engine speed 302 of the machine 100. The first signal corresponds to the operator input for the desired engine speed 302 of the machine 100 which may be in accordance with change in operational state of the machine 100.

At step 404, the controller 208 determines the pump speed 304 of the pump 204 based on the desired engine speed 302 of the machine 100. In some embodiments, the controller 208 determines the pump speed 304 of the pump 204 based on the desired engine speed 302 and the speed-up gear ratio between the primary conveyor 124 and the secondary conveyor 126. At step 406, the controller 208 determines the maximum possible motor speed 306 of the motor 202 based on the pump speed 304 of the pump 204 and the maximum possible gear ratio between the pump 204 and the motor 202. The maximum possible gear ratio between the pump 204 and the motor 202 may be determined based on the pump size of the pump 204 and the motor size of the motor 202. In some embodiments, the controller 208 determines the maximum possible motor speed 306 of the motor 202 based on the pump speed 304 of the pump 204, the maximum possible gear ratio between the pump 204 and the motor 202, the pump efficiency of the pump 204, and the motor efficiency of the motor 202.

At step 408, the controller 208 receives the second signal indicative of the desired conveyor speed 308 of the secondary conveyor 126. The controller 208 receives the second signal from the second operator interface 122. As evident, there is a need to cater to different sizes, types, configurations of the haul vehicle 116 and therefore control over the speed of the secondary conveyor 126 (i.e., the desired conveyor speed 308) is desirable. Moreover, since a fluctuating conveyor speed may lead to undesirable delivery rate of the material and/or trajectory of the material while discharging from the secondary conveyor 126 to the haul vehicle 116, it may lead to spillage and like losses which the present disclosure aims to minimize at the least.

At step 410, the controller 208 determines the desired motor speed 310 of the motor 202 based on the desired conveyor speed 308 of the secondary conveyor 126. In some embodiments, the controller 208 may determine the desired motor speed 310 of the motor 202 based on the desired conveyor speed 308 of the secondary conveyor 126 and the diameter of the roller 148 of the secondary conveyor 126. More specifically, the controller 208 determines the desired motor speed 310 of the motor 202 by obtaining the ratio of the desired conveyor speed 308 and the diameter of the roller 148. At step 412, the controller 208 determines the solenoid actuation current 314 of the solenoid actuator 206 based on the desired motor speed 310 of the motor 202 and the maximum possible motor speed 306 of the motor 202. In some embodiments, the controller 208 may at first determine the solenoid command ratio 312 of the solenoid actuator 206 based on the desired motor speed 310 of the motor 202 and the maximum possible motor speed 306 of the motor 202. The controller 208 may then determine the solenoid modulation range of the solenoid actuator 206 by determining the range between the minimum calibrated current of the solenoid actuator 206 and the maximum calibrated current of the solenoid actuator 206. The controller 208 may determine the solenoid actuation current 314 of the solenoid actuator 206 based on the minimum calibrated current of the solenoid actuator 206, the solenoid command ratio 312 of the solenoid actuator 206, and the solenoid modulation range of the solenoid actuator 206.

At step 414, the controller 208 supplies the solenoid actuation current 314 of the solenoid actuator 206 to the solenoid actuator 206 to actuate the pump 204 to drive the motor 202 at the desired motor speed 310 of the motor 202. At step 416, the controller 208 controls the speed of the secondary conveyor 126 based on the supplied solenoid actuation current 314 of the solenoid actuator 206 to actuate the pump 204 to drive the motor 202. The present disclosure provides the control of the conveyor system 102 independent of the variation is engine speed. When the engine speed of the machine 100 increases, the solenoid command ratio 312 of the solenoid actuator 206 decreases accordingly, and the solenoid actuation current 314 of the solenoid actuator 206 does not increase above a threshold and does not decrease below the threshold. Variation of the solenoid actuation current 314 in a pre-defined range actuates the pump 204 to drive the motor 202 in a desired range of speeds (desired motor speed 310) accordingly, therefore steadily operating the secondary conveyor 126. Similarly, when the engine speed of the machine 100 decreases, the solenoid command ratio 312 of the solenoid actuator 206 increases accordingly, and the solenoid actuation current 314 of the solenoid actuator 206 does not increase above a threshold and does not decrease below the threshold, therefore steadily operating the secondary conveyor 126.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

No element/component, act/action performed by any element/component, or instruction used herein should be construed as critical or essential unless explicitly described as such. Additionally, the phrase "based on" is intended to mean "based, at least in part, on" unless explicitly stated otherwise. Furthermore, the articles "a" and "an," as used herein, are intended to include one or more items, and may be used interchangeably with "one or more." In the event only one item is intended, the term "one" or similar language is used. Moreover, the terms "has," "have," "having," or the like, as also used herein, are intended to be open-ended terms.

What is claimed is:

1. A control system for a conveyor system of a machine, the control system comprising:
   a motor configured to drive the conveyor system;
   a pump operably coupled to the motor;
   a solenoid actuator configured to actuate the pump;
   a first operator interface configured to enable an operator to provide input indicative of a desired engine speed of the machine, and generate a first signal indicative of the desired engine speed;
   a second operator interface configured to enable the operator to provide input indicative of a desired conveyor speed of the conveyor system, and generate a second signal indicative of the desired conveyor speed of the conveyor system;
   a controller communicably coupled to the motor, the pump, the solenoid actuator, the first operator interface, and the second operator interface, the controller configured to:
      receive the first signal indicative of the desired engine speed of the machine;
      determine a pump speed of the pump based on the desired engine speed of the machine;
      determine a maximum possible motor speed of the motor based on the pump speed of the pump and a maximum possible gear ratio between the pump and the motor;
      receive the second signal indicative of the desired conveyor speed of the conveyor system;
      determine a desired motor speed of the motor based on the desired conveyor speed of the conveyor system;
      determine a solenoid actuation current based on the desired motor speed of the motor and the maximum possible motor speed of the motor;
      supply the determined solenoid actuation current to the solenoid actuator to actuate the pump to drive the motor at the desired motor speed of the motor; and
      control a speed of the conveyor system based on the supplied solenoid actuation current.

2. The control system of claim 1, wherein the controller determines the pump speed of the pump based on the desired engine speed of the machine and a speed-up gear ratio.

3. The control system of claim 1, wherein the controller determines the maximum possible motor speed of the motor based on the pump speed of the pump, the maximum possible gear ratio between the pump and the motor, and at least one of a pump size of the pump, a pump efficiency of the pump, a motor size of the motor, or a motor efficiency of the motor.

4. The control system of claim 1, wherein the controller is further configured to:
   determine a solenoid command ratio of the solenoid actuator based on the desired motor speed of the motor and the maximum possible motor speed of the motor;
   determine a solenoid modulation range of the solenoid actuator based on a maximum calibrated current of the solenoid actuator and a minimum calibrated current of the solenoid actuator, and
   determine the solenoid actuation current of the solenoid actuator based on the minimum calibrated current of the solenoid actuator, the solenoid command ratio of the solenoid actuator, and the solenoid modulation range of the solenoid actuator.

5. The control system of claim 4, wherein the controller determines the solenoid actuation current of the solenoid actuator by:
   multiplying the solenoid modulation range of the solenoid actuator with the solenoid command ratio of the solenoid actuator to determine a multiplication value; and
   adding the determined multiplication value to minimum calibrated current of the solenoid actuator to obtain the solenoid actuation current of the solenoid actuator.

6. The control system of claim 1, wherein the controller determines the desired motor speed of the motor based on the desired conveyor speed of the conveyor system and a pulley diameter of the conveyor system.

7. A method to control a conveyor system of a machine, the method comprising:
   receiving, using a controller, a first signal indicative of a desired engine speed of the machine;
   determining, using the controller, a pump speed of a pump based on the desired engine speed of the machine;
   determining, using the controller, a maximum possible motor speed of a motor based on the pump speed of the pump and a maximum possible gear ratio between the pump and the motor;
   receiving, using the controller, a second signal indicative of the desired conveyor speed of the conveyor system;
   determining, using the controller, a desired motor speed of the motor based on the desired conveyor speed of the conveyor system;
   determining, using the controller, a solenoid actuation current of a solenoid actuator based on the desired motor speed of the motor and the maximum possible motor speed of the motor;
   supplying, using the controller, the solenoid actuation current of the solenoid actuator to the solenoid actuator to actuate the pump to drive the motor at the desired motor speed of the motor, and
   controlling, using the controller, a speed of the conveyor system based on the supplied solenoid actuation current.

8. The method of claim 7, wherein the controller determines the pump speed of the pump based on the desired engine speed of the machine and a speed-up gear ratio.

9. The method of claim 7, wherein the controller determines the maximum possible motor speed of the motor based on the pump speed of the pump, the maximum possible gear ratio between the pump and the motor, and at least one of a pump size of the pump, a pump efficiency of the pump, a motor size of the motor, or a motor efficiency of the motor.

10. The method of claim 7 further comprising:
    determining, using the controller, a solenoid command ratio of the solenoid actuator based on the desired motor speed of the motor and the maximum possible motor speed of the motor;
    determining, using the controller, a solenoid modulation range of the solenoid actuator based on a maximum calibrated current of the solenoid actuator, and a minimum calibrated current of the solenoid actuator; and
    determining, using the controller, the solenoid actuation current of the solenoid actuator based on the minimum calibrated current of the solenoid actuator, the solenoid command ratio of the solenoid actuator, and the solenoid modulation range of the solenoid actuator.

11. The method of claim 10, wherein determining the solenoid actuation current of the solenoid actuator includes:

multiplying the solenoid modulation range of the solenoid actuator with the solenoid command ratio of the solenoid actuator to determine a multiplication value; and
adding the determined multiplication value to the minimum calibrated current of the solenoid actuator to determine the solenoid actuation current of the solenoid actuator.

12. The method of claim 7, wherein the controller determines the desired motor speed of the motor based on the desired conveyor speed of the conveyor system and a pulley diameter of the conveyor system.

13. The method of claim 7, wherein the controller receives the first signal indicative of the desired engine speed of the machine from a first operator interface; and
wherein the controller receives the second signal indicative of the desired conveyor speed of the conveyor system from a second operator interface.

14. The method of claim 7, wherein the solenoid actuator is configured to actuate the pump, and the pump is operably coupled to the motor to drive the motor.

15. A machine comprising:
a conveyor system including:
a primary conveyor,
a secondary conveyor configured to convey material from the primary conveyor to a discharge location;
a motor configured to drive the secondary conveyor,
a pump operably coupled to the motor;
a solenoid actuator configured to actuate the pump; and
a controller communicably coupled to the motor, the pump, and the solenoid actuator, the controller configured to:
receive a first signal indicative of a desired engine speed of the machine;
determine a pump speed of the pump based on the desired engine speed;
determine a maximum possible motor speed of the motor based on the pump speed of the pump and a maximum possible gear ratio between the pump and the motor;
receive a second signal indicative of a desired secondary conveyor speed of the secondary conveyor,
determine a desired motor speed of the motor based on the desired secondary conveyor speed of the secondary conveyor;
determine a solenoid actuation current based on the desired motor speed of the motor and the maximum possible motor speed of the motor;
supply the determined solenoid actuation current to the solenoid actuator to actuate the pump to drive the motor at the desired motor speed; and
control a speed of the secondary conveyor based on the supplied solenoid actuation current.

16. The machine of claim 15, wherein the controller determines the pump speed of the pump based on the desired engine speed of the machine, and a speed-up gear ratio.

17. The machine of claim 15, wherein the controller determines the maximum possible motor speed based on the pump speed of the pump, the maximum possible gear ratio between the pump and the motor, and at least one of a pump size of the pump, a pump efficiency of the pump, a motor size of the motor, and a motor efficiency of the motor.

18. The machine of claim 15, wherein the controller is further configured to:
determine a solenoid command ratio based on the desired motor speed of the motor and the maximum possible motor speed of the motor;
determine a solenoid modulation range based on a maximum calibrated current of the solenoid actuator, and a minimum calibrated current of the solenoid actuator; and
determine the solenoid actuation current based on the minimum calibrated current of the solenoid actuator, the solenoid command ratio of the solenoid actuator, and the solenoid modulation range of the solenoid actuator.

19. The machine of claim 18, wherein, when determining the solenoid actuation current of the solenoid actuator, the controller is to:
multiply the solenoid modulation range of the solenoid actuator with the solenoid command ratio of the solenoid actuator to determine a multiplication value; and
add the determined multiplication value to minimum calibrated current of the solenoid actuator to obtain the solenoid actuation current of the solenoid actuator.

20. The machine of claim 15, wherein the controller determines the desired motor speed based on the desired secondary conveyor speed of the secondary conveyor and a pulley diameter of the secondary conveyor.

* * * * *